United States Patent [19]

Ainslie et al.

[11] Patent Number: 4,974,933
[45] Date of Patent: Dec. 4, 1990

[54] OPTICAL WAVEGUIDES AND THEIR MANUFACTURE

[75] Inventors: Benjamin J. Ainslie, Rushmere; Howard P. Girdlestone, Felixstowe, both of England

[73] Assignee: British Telecommunications plc, London, England

[21] Appl. No.: 52,979

[22] Filed: May 22, 1987

[30] Foreign Application Priority Data

Jun. 4, 1986 [GB] United Kingdom ............... 8613525
Mar. 18, 1987 [GB] United Kingdom ............... 8706461

[51] Int. Cl.$^5$ .......................................... G02B 6/16
[52] U.S. Cl. ............... 350/96.34; 350/96.30; 65/3.11
[58] Field of Search ............. 350/96.29, 96.30, 96.34; 65/3.11, 3.12

[56] References Cited

U.S. PATENT DOCUMENTS

| | | | |
|---|---|---|---|
| 3,254,031 | 5/1966 | DePaolis et al. | 106/47 |
| 3,571,737 | 3/1971 | Miller | 330/4.3 |
| 3,599,106 | 8/1971 | Suitzer | 330/4.3 |
| 3,615,766 | 10/1971 | Piesslinger et al. | 106/50 |
| 3,636,473 | 1/1972 | Young | 331/94.5 |
| 3,785,834 | 1/1974 | Rapp | 106/39.6 |
| 3,808,549 | 4/1974 | Maurer | 350/96.32 |
| 3,864,113 | 2/1975 | Dumbaugh | 65/60 |
| 3,894,857 | 7/1975 | Uchida et al. | 65/3 |
| 3,938,974 | 2/1976 | Macedo et al. | 350/96.34 X |
| 3,971,645 | 7/1976 | Bachmann et al. | 65/3.12 |
| 4,040,890 | 8/1977 | Burrus, Jr. et al. | 350/96 WG |
| 4,149,772 | 4/1979 | Iyengar et al. | 350/96.32 |
| 4,195,907 | 4/1980 | Zamja et al. | 350/96.32 |
| 4,283,213 | 8/1981 | Akers et al. | 65/3 A |
| 4,419,115 | 12/1983 | Johnson, Jr. et al. | 65/18.1 X |
| 4,422,719 | 12/1983 | Orcutt | 350/96.30 |
| 4,597,787 | 7/1981 | Jacobson | 65/3.12 |
| 4,618,211 | 10/1986 | Fleury | 350/96.15 |
| 4,637,025 | 1/1987 | Snitzer et al. | 350/96.34 |
| 4,666,486 | 5/1987 | Hutta | 65/3.11 |
| 4,715,679 | 12/1987 | Bhagavatula | 350/96.33 |
| 4,726,652 | 2/1988 | Tajima et al. | 350/96.34 |
| 4,780,877 | 10/1988 | Snitzer | 350/96.18 |

FOREIGN PATENT DOCUMENTS

| | | |
|---|---|---|
| 8701110 | 2/1987 | European Pat. Off. . |
| 2417963 | 8/1975 | Fed. Rep. of Germany . |
| 2238679 | 2/1975 | France . |
| 2339266 | 8/1977 | France . |
| 2140169 | 11/1984 | United Kingdom . |
| 86/07348 | 12/1986 | World Int. Prop. O. . |

OTHER PUBLICATIONS

Electronics Letters, vol. 22, No. 8, Apr. 10, 1986, pp. 411–412, S. Patela et al., "Non Linear Prism Coupling in Wave Guiding . . . ".
Soviet Journal of Quantum Electronics, vol. 12, No. 10, Oct. 1982, pp. 1343–1345, V. G. Abashkin et al., "Non Linear Absorption . . . ".
Soviet Journal of Quantum Electronics, vol. 12, No. 12, Dec. 1982, pp. 1571–1574, V. G. Abashkin et al., "Glassy Chalcogenide Semiconductor . . . ".
Journal of the Optical Society of America, vol. 73, No. 5, May 1983, pp. 647–653, R. R. Join et al., "Degenerate Four-Wave Mixing . . . ".
Digest of Technical Papers: Conference on Laser and Electro Optics, May 21–24, 1985, p. 290, OSA/IEEE, S. S. Yau et al., "Ultrafast Optical Signal Processing Using Semiconductor-Doped Glasses".
Electronics, vol. 43, No. 20, 28th Sep. 1979, pp. 129–130, N.Y. US: "Glass Laser Fibers Help Transmit and Amplify Beams".

(List continued on next page.)

Primary Examiner—John D. Lee
Assistant Examiner—Phan T. Heartney
Attorney, Agent, or Firm—Nixon & Vanderhye

[57] ABSTRACT

Optical fibre contains a colloidal semiconductor dispersed in the core or the cladding or both. The fibre may have active regions in which the semiconductor is dispersed and passive regions in which the semiconductor is dissolved. This is obtained by drawing a preform to get fibre in which the semiconductor is dispersed and selected portions (or else the whole fibre) are treated to precipitate the semiconductor in colloidal form.

16 Claims, 2 Drawing Sheets

OTHER PUBLICATIONS

Optical Fiber Communication Conference, Technical Digest, 24th-26th Feb. 1986, Atlanta, Ga., Paper TUL15, pp. 62-64. IEEE, N.Y., US: R. J. Mears et al., "Rare-Earth-Doped Fiber Lasers".

Applied Physics Letters, vol. 23, No. 7, 10.1.73, pp. 388-389, Amer. Inst. of Physics: J. Stone et al: "Neodymium-Doped Silica Lasers in End-Pumped Fiber Geometry".

Journal of the American Ceramic Society, vol. 56, No. 2, Feb. '73, pp. 68-72, E. A. Weaver et al: "Lasing in a Phase-Separated Glass".

Journal of the Electrochemical Society, vol. 122, No. 1, Jan '75, pp. 101-107, F. Auzel et al., "Rare Earth Doped Vitroceramics: New, Efficient, Blue and Green Emitting Materials for Infrared Up-Conclusions".

Japanese Journal of Applied Physics, vol. 23, No. 6, pt. 3, 6/84, pp. L409-L411, Tokyo, JP: H. Namikawa et al., "Preparation of $SiO_2$ Lasses by Axial Injection Plasma Torch CVD and Their Fluorescence Properties".

Electronics Letters, 8/15/85, vol. 21, No. 17, "Fabrication of Low-Loss Optical Fibres Containing Rare-Earth Ions", pp. 737-738.

Electronics Letters, vol. 22, No. 8, 4/10/86, pp. 411-412, Hitchin, Herts, GB: S. Patela et al., "Non-Linear Prism Coupling in Wave Guiding Structures Deposits on to Semiconductor-Doped Glass".

Soviet Journal of Quantum Electronics, vol. 12, no. 10, 10/82, pp. 1343-1345, N.Y., V. G. Abashkin et al., "Non-inear Absorption of Light in Glassy Arsenic Surlfide Fibers in the Energy Range Hnu less than Eg".

Soviet Journal of Quantum Electronics, vol. 12, No. 12, 12/82, pp. 1571-1574, N.Y., V. G. Abashkin et al: "Glass Chalcogenide Semiconductor Fibers".

Journal of the Optical Society of America, vol. 73, No. 5, 5/83, pp. 647-653, N.Y., R. R. Join et al., "Degenerate Four-Wave Mixing in Semiconductor-Doped Lasses", Abstract.

Digest of Technical Papers, "Conference on Laser and Electro Optics", 21-24 May 85, p. 290, OSA/IEEE, Blatimore, Md., U.S.: S. S. Yau et al., "Ultrafast Optical Signal Processing Using Semiconductor-Doped Glasses".

Fig. 2. A

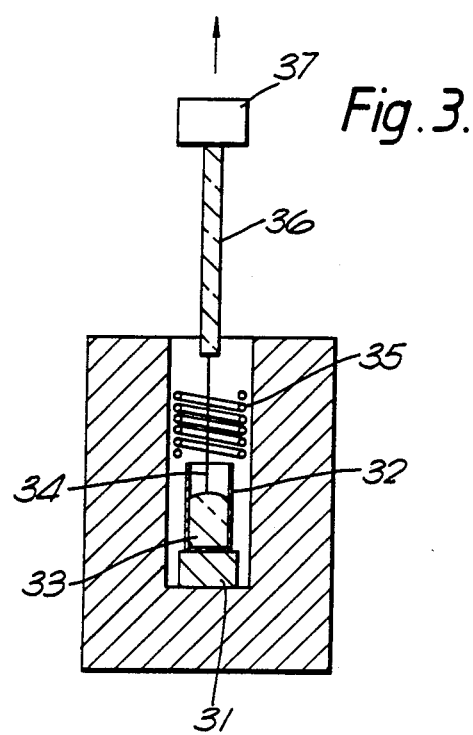
Fig. 3.
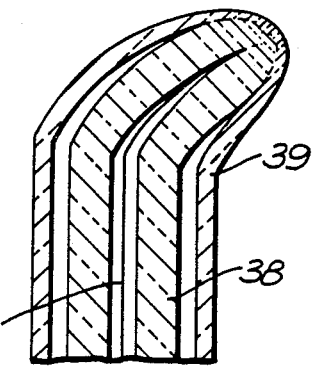
Fig. 4.
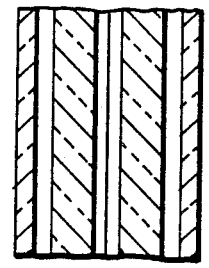

OPTICAL WAVEGUIDES AND THEIR MANUFACTURE

FIELD OF THE INVENTION

This invention relates to a method of preparing optical wave guiding structures, e.g. multimode and monomode glass fibres. At least a selected portion of the structure contains a dopant, e.g. a semiconductor, in colloidal form.

The structures which contain colloidal semiconductors have a refractive index which is intensity dependent.

BACKGROUND AND SUMMARY OF THE INVENTION

It is known that semiconductor materials, e.g. cadmium sulphide which possesses a large third order susceptibilty, have a refractive index which is dependent on the intensity of incident radiation. It has been proposed to utilise this property in the broad field of optical signal processing, e.g. as bistable elements and optical power dependent switches.

Recently a class of materials known as semiconductor doped glasses have been examined for non-linear properties. These materials consist of oxide glasses in which semiconductor crystallites are dispersed and these glasses are available as optical filters. The band gap and dimensions of the dispersed semiconductor crystallites determines the cut-off wave length of the filter. This can be varied by suitable choice of the semiconductor, and processing conditions. Ironside et al, in a paper "Wave guide fabrication in non-linear semiconductor glasses" ECOC 85 (Venice) especially at page 237, have proposed to make planar wave-guiding structures by ion-exchange with suitable glasses of this type.

Patela et al, in Electronics Letters of Apr. 10, 1986, Vol. 22, No. 8 at pages 411 and 412 consider the fabrication and properties of a non-linear wave guiding structure consisting of a thin film of Corning 7059 glass deposited on the surface of $CdS_xSe_{1-x}$ doped glass. Abashkin et al, in Soviet Journal of Quantum Electronics, Vol. 12 (1982) October, No. 10, published in New York, USA, at pages 1343 to 1345 discuss the propagation of light in chalcogenide semiconductor fibres.

This invention comprises a glass optical fibre, e.g. a monomode fibre, wherein either the core or the cladding or both core and cladding take the form of a continuous glass phase having dispersed therein colloidal particles of a semiconductor, e.g. a semiconductor having a band gap of 3.8 to 0.27 ev, especially 2.5 to 1.4 ev. The colloidal particles preferably have sizes in the range 1 to 1000 nm.

Examples of suitable semiconductors include

| | | |
|---|---|---|
| $CdS_wSe_{(1-w)}$, | $CdSe_xTe_{(1-x)}$, | $PbS_ySe_{(1-y)}$, |
| CuCl, | CuBr, | $ZnS_aSe_{(1-a)}$, |
| $Pb_bCd_{(1-b)}Se$, | $In_2Te_3$ | $Sb_2Se_3$ | wherein w, x, y, a and b are 0 to 1 inclusive.

The invention also comprises devices which include a fibre according to the invention. Such devices preferably comprise an un-jointed length of fibre having at least one active region and at least one passive region wherein, in the or each passive region, the semiconductor is dissolved in the glass continuous phase and, in the or each active region, the semiconductor is colloidally dispersed. This preferred form confines the non-linear activity to the region(s) where it is desired, i.e. to the active region(s) where the particles are present. It also avoids losses because there are no joints between the active region(s) and the feeder(s).

The fibres according to the invention are fabricated by the conventional drawing of a preform which contains the semiconductor either dispersed or dissolved. If the semiconductor is dissolved, or if it dissolves during processing, then it is necessary to precipitate it as a colloid in the final fibre. This precipitation may be achieved by:

(a) heat treatment, e.g. relatively short periods at high temperature or longer periods at low temperatures such as 1 minute at 700° C. or 30 minutes at 600° C.;
(b) laser initiation at wave lengths where the host glass absorbs, e.g. UV and IR;
(c) electron beam treatment;
(d) ion bombardment.

When the final product contains active and passive regions the treatment is applied only to the active region or regions.

Some of the semiconductor dopants which are used in the invention are well known as colourants for glass and, in particular, as additives for filter glasses which have a well defined cut-off wave length. (Some semiconductors, e.g. those having band gaps of 0.27 to 0.4 ev such as PbSe and PbS have cut-offs at wavelengths in the region of 3 $\mu$m and these appear black to the eye).

BRIEF DESCRIPTION OF THE DRAWINGS

Preparations according to the invention will now be described by way of example with reference to the accompanying drawings in which:

FIGS. 3 and 4 illustrate a variant of FIGS. 1 and 2.

DETAILED DESCRIPTION

Figure 1:
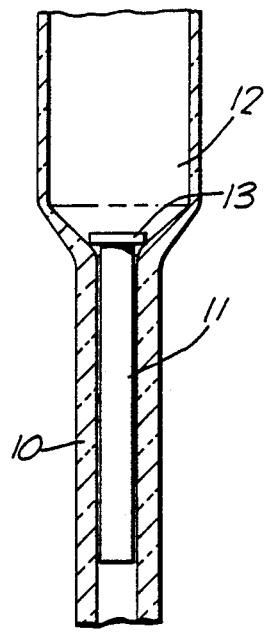
FIG. 1 illustrates a two-layer preform for making an optical fibre having a core and a cladding.
Figure 1:
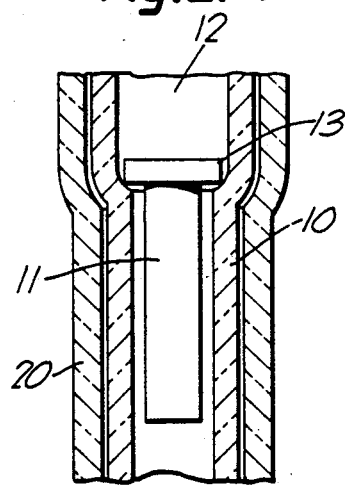

As shown in FIG. 1, the preform comprises a rod 11 which is situated in the bore of a tubular member 10. The tubular member 10 has an enlarged portion 12 which functions as a handle during processing. The rod 11 has a head 13 which can be accommodated in the enlarged portion 12 but which prevents the rod 11 entering too far into the tube 10 during drawing. The rod 11 and the inner face of the tube 10 are mechanically polished to facilitate fusion. There is a small annulus, e.g. about 200 to 800 $\mu$m, between rod 11 and tube 10 so that the rod slides easily into the tube. The assembly can be heated to drawing temperature (which causes the tube 11 to shrink onto the rod 10) and drawn into fibre.

FIGS. 2A and 2B show a modification in which there is an outer tube 20 which serves to provide a protective layer during processing and also in the final product.

Figure 2:
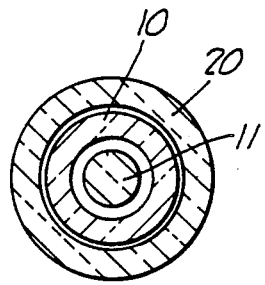
FIGS. 2A and 2B illustrate a three-layer preform for making an optical fibre in which the core and cladding are protected by a third outer-layer.

It will be appreciated that the basic mechanics are conventional, e.g. the "rod-in-tube" process. However, either the tube 10 or rod 11 contains the dopant which is either (a) retained as a colloid throughout or (b) dissolved, e.g. to give a solid phase supersaturated solution in the fibre. At least portions of said fibre are treated, e.g. for a suitable time at a suitable temperature, so as to cause some (or all) of the dissolved dopant to precipitate as a colloid. It should be noted that any dopant which remains dissolved has little or no effect on the useful properties. Thus, while it is important to precipitate enough of the dopant, there is no need to precipitate all of it. For convenience some will usually be left in solution. The three-layer version of FIG. 2 is particularly appropriate for doped cladding.

Three specific embodiments of the invention will now be described by way of example.

EXAMPLE 1

Tube 10 has a bore diameter of 4.5 mm and 7 mm outer diameter formed of a sodium/calcium silicate glass. It was bought from Gallenkamp Ltd.

Rod 11 has a diameter of 3 mm and it was formed of Schott filter glass OG 530 which is a potassium/zinc silicate glass doped with colloidal cadmium sulphoselenide. Since rod 11 has a diameter of 3 mm and the bore of tube 10 a diameter of 4.5 mm there is an annulus about 750 μm.

This assembly was heated to about 1000° C. (at which temperature both rod 11 and tube 10 became very fluid). This caused tube 10 to shrink onto rod 11 and it also caused the colloidal dopant to dissolve. The hot-work was drawn by hand to fibre of total diameter 250 μm with a core of 150 μm diameter.

The transmission properties of the fibre were compared with the transmission properties of the untreated rod. The rod acted as a filter with a cut-off at short wave lengths (note this is the commercial purpose of filter glass OG 530) but the drawn fibre did not. This indicates that the colloidal particles had dissolved (which destroys the filtering effect and the non-linear effect). The fibre also had a high transparency which confirms the lack of particles. In other words, the core consists of a supersaturated (solid) solution of the semiconductor in the glass phase.

A portion of the clear drawn fibre, i.e. a portion 10 mm in length, was heated to approximately 700° C. for approximately 1 minute. The yellow colour typical of the filter re-appeared implying that the semiconductor had re-precipitated. A transmission spectrum of the fibre was plotted and the plot showed a cut-off typical of the colloidal filter. This also implies that the semiconductor had re-precipitated as a colloid. (As an alternative the semiconductor was re-precipitated by heating a (different) segment for 30 minutes at 600° C.).

EXAMPLE 2

This example replicates Example 1 but the assembly was only heated to about 720° C. (instead of 1000° C.). At this lower temperature the colloidal dopant did not dissolve although its particle size increased slightly..

There was, therefore, no need to re-precipitate the dopant.

EXAMPLE 3

Fibre with a dopant in the cladding can also be made but using the three-layer structure illustrated in FIG. 2B. This would result in a fibre with an outer layer which protects the fibre during the re-precipitation of the colloid. Fibre with a semiconductor colloid in the cladding is particularly useful for making intensity dependent switches.

EXAMPLE 4

The source glass used in this example was Hoya filter glass H 640 which is a sodium./potassium/zinc silicate glass which contains about 0.5 to 1 weight % of colloidal cadmium sulphoselenide.

A suitable quantity of H 640, shown as melt 33 in FIG. 3, was melted at approximately 1050° C. in a furnace 30. The melt 33 was contained in a platinum/gold crucible 32 which stands on a support block 31. A cooling coil 35 is located above the mouth of crucible 32. The height of the colling coil 35, i.e. its height above the crucible 32 is adjustable by means not shown. FIG. 3 shows a silica rod 34 which is in the course of production. The rod 34 is attached to the end of a silica bar 36 which is held in movable clamp 37. The cross section of bar 36 is small enough so that it can be inserted into the crucible 33 via cooling coil 35.

It will be appreciated that the following adjustments tend to favour thicker rods (and the inverse adjustments favour thinner rods):

(1) A lower furnace temperature giving a more viscous melt.
(2) A smaller distance between the cooling coil 35 and the melt 33 giving less chance for pulled melt to return to the crucible, and
(3) The speed of pulling, e.g. 50 to 200 mm/sec.

The method of preparing rod 34 is as follows:

The melt 33 in the crucible 32 contains the semiconductor in the dissolved state. To start production of the rod 34, the bar 36 is lowered through cooling coil until it just touches the surface of the melt 33. On withdrawing the rod 34 at a controlled rate, melt 33 adheres and, therefore, a portion of the melt is drawn upwards. The cooling coil 35 reduced the temperature of this portion so that it cools to a solid rod. However, the temperature of the solid rod is not high enough to prevent precipitation of the dissolved semiconductor. Thus it contains a supersaturated solution of the semiconductor.

The diameter of the rod 34 is controlled by:

(1) The temperature of furnace 30, approximately 1050° C.
(2) The distance between the cooling coil 35 and the surface of the melt 33, e.g. 50 to 150 mm.

Using the technique described above, we have prepared rods with diameters of 0.2 mm to 2 mm.

FIG. 4 shows a rod 34, prepared as described above, located in the bore of a capillary tube 38 which is contained inside an outer sleeve 39. At its top end the assembly is bent and fused so that its components are secured together. The length of the assembly was about 1 m.

As implied above, rod 34 is made of a potassium/zinc silicate glass which contains dissolved cadmium sulphoselenide. Its diameter is 0.1 mm.

Capillary 38 is made of sodium-calcium silicate glass. Its outer diameter is 6.0 mm and its bore diameter is 1.5 mm.

Sleeve 39 is made of sodium calcium silicate glass.. Its outer diameter is 10 mm and its bore diameter is 8.0 mm.

Using a conventional furnace (model TF 685 made by Severn Science) at 1080° C., the assembly of FIG. 4 was drawn into optical wave-guiding fibre. In a set of experiments fibres with diameters in the range 0.08 mm to 0.15 mm were prepared. The drawing temperature of 1080° C. was chosen so that the semiconductor remained in supersaturated solution, i.e. "clear" fibre was produced.

The reduction of diameter, namely 10 mm for the outer sleeve tube to values in the range 0.08 mm to 0.15 mm, implies that the length must be stretched about 4,000 to 16,000 times. These draw ratios are conveniently produced by feeding the assembly at a rate of 2 to 20 mm/min and pulling fibre at a rate of 10 to 60 mm/min.

After drawing the fibre was heated at 600° C. for 30 minutes. This precipitated the semiconductor as a colloid.

Specific examples of absorption cut-offs are given below in tables I and II. Absorption measurements were made on lengths of fibre 10 mm long. The fibre transmits at higher wavelengths and it becomes strongly absorbent at lower wavelengths.

The cut-off is specified as two values, i.e. in the form A/B. A is the (longer) wavelength in nm at which attenuation becomes noticeable. B is the (shorter) wavelength in nm at which attenuation is approximately 20 dB.

The notation "A/B" indicates the location and sharpness of the cut-off edge.

Three samples of glass fibre were heated for / minutes each at the temperature specified in Table I, and (when cold) the cut-offs were measured.

TABLE I

| TEMP | CUT-OFF |
|---|---|
| 635° C. | 650/635 |
| 653° C. | 660/645 |
| 661° C. | 670/655 |

In a second set of experiments three samples were all heated at 640° C. each for the time stated in Table 11. Cut-offs were measured when cold.

TABLE II

| TIME | CUT-OFF |
|---|---|
| 90 secs | 550/520 |
| 180 secs | 600/570 |
| 360 secs | 635/705 |

It can be seen that high temperatures and longer times move the cut-off to longer wavelengths, i.e. radiation having less energetic quanta. It is believed that this observation can be explained as follows. Higher temperatures and longer times both tend to grow larger colloidal particles and the smaller particles have larger bandgaps (known as quantum size effects) which correspond to attenuation at shorter wavelengths. (It is difficult to measure the size of the colloidal particles but this is believed to be about 20 nm).

EXAMPLE 5

Samples of the assembly shown in FIG. 4 were also drawn into fibre at lower temperatures, e.g. 950° C. At these lower temperatures the semiconductor was precipitated as a colloid. The rate of drawing was 8 mm/min for the preform and 30 m.min for the fibre, giving a fibre with diameter of 0.16 mm. The size of the colloidal particles of the semiconductor was about 20 to 30 nm.

The well known technique called "double crucible" is also applicable to making fibre according to the invention. This technique uses concentric crucibles which contain molten glass, i.e. one crucible for each region of the fibre. The crucibles are associated with a concentric die and the fibre structure is drawn directly from the melt. The crucibles may be continuously recharged during drawing, e.g. by lowering rods into the melts to maintain a constant level.

The fibre drawing can be carried out using doped, preferably semiconductor doped, glass in one or more of the crucibles. In the melt the dopant dissolves and the drawing is carried out under such conditions that the dopant remains in solution, i.e. fibre containing a supersaturated solution of dopant is produced. (Keeping the dopant in solution is achieved provided that the rate of cooling of the fibre is kept fast enough).

Thus conventional double crucible techniques are used to provide fibre which contains a supersaturated solution of dopant in either or both the core and the cladding. As described above, the dopant is precipitated, either in the whole or selected portions of the fibre.

The examples specifically described the precipitation of cadmium sulphoselenide semiconductors. Other materials, e.g. gold, can be precipitated according to the invention. As the specialist compositions of this invention form only a small portion of a transmission system there is wide flexibility to select the host glass for its properties as a solvent for the dopant.

We claim:

1. An optical fibre which comprises a glass core and a glass cladding wherein either the core or the cladding or both take the form of a continuous glass phase having dispersed therein colloidal particles of a dopant, said optical fibre including at least one active region and at least one passive region wherein the or each active region includes the dopant as a colloidal dispersion and the or each passive region includes the dopant as a solution.

2. An optical fibre which comprises a glass core and a glass cladding wherein either the core or the cladding or both take the form of a continuous glass phase having dispersed therein colloidal particles of a dopant, wherein the dopant is a semiconductor.

3. A fibre according to claim 2, wherein the semiconductor has a band gap of 3.8 to 0.27 ev.

4. A fibre according to claim 3, wherein the band gap is 2.5 to 1.4 ev.

5. A fibre according to claim 2, wherein the semiconductor is selected from compounds of the formulas

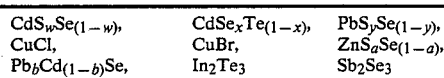

| $CdS_wSe_{(1-w)}$, | $CdSe_xTe_{(1-x)}$, | $PbS_ySe_{(1-y)}$, |
| CuCl, | CuBr, | $ZnS_aSe_{(1-a)}$, |
| $Pb_bCd_{(1-b)}Se$, | $In_2Te_3$ | $Sb_2Se_3$ | wherein each of, w, x, y, a and b is within the range 0 to 1 inclusive.

6. A fibre according to claim 2, wherein the fibre is a monomode fibre.

7. A method of making wave guiding structures, which method comprises providing an optical wave guiding structure for guiding light which comprises a glass path region operatively associated with at least one glass confining region wherein at least one region selected from the path region and a glass confining region contains a dissolved dopant and wherein at least one selected portion of the structure is treated to precipitate the dopant in colloidal form, wherein the dopant is semiconductor.

8. A method according to claim 7, wherein the dissolved dopant is in the form of supersaturated solution of dopant in glass.

9. A method according to claim 7, in which the semiconductor is selected from compounds of the formulas

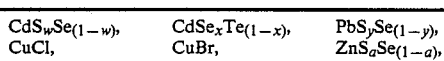

| $CdS_wSe_{(1-w)}$, | $CdSe_xTe_{(1-x)}$, | $PbS_ySe_{(1-y)}$, |
| CuCl, | CuBr, | $ZnS_aSe_{(1-a)}$, |

| | | |
|---|---|---|
| $Pb_bCd_{(1-b)}Se$, | $In_2Te_3$, | $Sb_2Se_3$ | wherein each of, w, x, y, a and b is within the range 0 to 1 inclusive.

10. A method according to any one of claims 7 or 8, wherein the wave guiding structure is a fibre, the path region being the core and the confining region being cladding surrounding the core.

11. A method according to claim 10, wherein the fibre is produced by drawing a plurality of glass compositions into an optical fibre, at least one of said glass compositions containing a semiconductor which dissolves or remains dissolved under the drawing conditions.

12. A method according to claim 10, which comprises treating only a selected portion or portions of the fibre to produce a fibre product having at least one active zone containing colloidal semiconductor and at least one passive zone containing dissolved semiconductor.

13. A method according to claim 10, which comprises treating the whole length of fibre and thereafter cutting the fibre into lengths suitable for making devices.

14. A glass optical fibre for guiding light comprising a glass core and a glass cladding wherein the core takes the form of a continuous glass phase having dispersed therein colloidal particles of a dopant, wherein substantially the whole length of the fibre contains the dopant as colloidal dispersion, wherein the dopant is a semiconductor.

15. A fibre according to claim 14, wherein the fibre is a monomode fibre.

16. A fibre according to claim 14, wherein the semiconductor is selected from compounds of the formulas:

| | | |
|---|---|---|
| $CdS_wSe_{(1-w)}$, | $CdSE_xTe_{(1-x)}$, | $PbS_ySe_{(1-y)}$, |
| CuCl, | CuBr, | $ZnS_aSe_{(1-a)}$, |
| $Pb_bCd_{(1-b)}Se$, | $In_2Te_3$, | $Sb_2Se_3$, | wherein each of w, x, y, a and b is within the range of 0 to 1 inclusive.

* * * * *